Jan. 24, 1928.

K. W. MONROE 1,657,172

METHOD OF MAKING COMPOUND CELLULOSE ESTER PLASTIC

Original Filed Oct. 30, 1923

K. W. Monroe, Inventor

By his attorney

Patented Jan. 24, 1928.

1,657,172

UNITED STATES PATENT OFFICE.

KARL W. MONROE, OF NORTH ARLINGTON, NEW JERSEY, ASSIGNOR, BY MESNE ASSIGNMENTS, TO DU PONT VISCOLOID COMPANY, OF WILMINGTON, DELAWARE, A CORPORATION OF DELAWARE.

METHOD OF MAKING COMPOUND CELLULOSE-ESTER PLASTIC.

Application filed October 30, 1923, Serial No. 671,692. Renewed June 21, 1927.

This invention relates to the making of cellulose ester plastic, e. g. pyroxylin plastic such as pyralin and celluloid and has particular reference to a method of making a decorative plastic having incorporated therein metal foil, for example tin or gold foil. The product of such method is a compound structural sheet which simulates mother of pearl and other variegated shell structures; and, more specifically, it is a composite sheet of cellulose ester plastic and foil which is presented to the surface of the sheet in substantially edgewise relation to give an edge grain effect in the composite article.

An object of the invention is to provide a method of making cellulose ester plastic compound products of the character above outlined. To this end, and also to improve generally upon methods of the character indicated, the invention consists in the various matters hereinafter described and claimed.

Without restricting the invention thereto, I describe in detail one way of practicing the method, it being understood that considerable departure from the detail procedure may be made without departure from the invention. As an aid to the understanding of the process, I have shown in the accompanying drawings, somewhat conventionally, the materials at different stages of the procedure, together with elementary showings of apparatus that may be used. In these drawings:—

In brief, the method comprises welding together in a solid block sheets of cellulose ester plastic inter-leaved with foil, with the material so arranged in the press as to give a block of plastic with foil lying therein as irregular graining; and then sheeting the block across the grain, giving the desired material. These sheets are, desirably, then straightened and polished, and are useable for various ornamental and useful articles, such as buttons and the like. To increase the strength of the sheets they may have attached thereto, on one or both faces, a sheet of transparent plastic. In describing the method in detail, I take as an example the making of a variegated sheet of pyroxylin plastic but of course the invention is not confined to the making of such a variegated sheet nor to cellulose nitrate as the cellulose ester. In detail then, the procedure may be as follows:—

Figure 1:
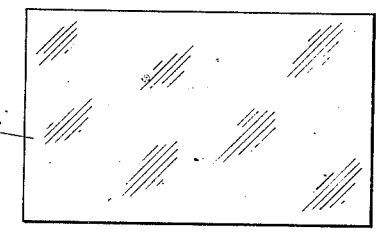
Figure 1 is a face view of one of the plastic sheets used in making up the stack of plastic and foil sheets Figure 2.

First; nitrocellulose, camphor and stabilizing materials, previously colloided, for example with denatured alcohol, are subjected to the usual rolling or grinding operations to produce sheets or slabs; and these slabs are formed into a cake and the cake sheeted to give transparent sheets of plastic. The operations of making plastic sheets are of course well known to those skilled in the cellulose plastic arts. However, for clearness I have shown in Figure 1 a sheet 1; and for completeness I review the operations as follows: To give the desired color effects pigments, dyestuffs or bronzing materials may be ground or rolled into, or brushed onto the colloid, for example onto sheet stock delivered by the rolls; and if desired the grinding or rolling in and the brushing on may be used in conjunction. At the rolls the excess solvent is worked off, the percentage remaining varying from approximately 8 to 15% and, for present purposes, a relatively high percent, say 12 to 15, being desirable. Desirably, to obtain a number of somewhat differently colored sheets, the colloid to be rolled is divided into several portions, say four, and each given a distinct color, as blue, green, pink or violet. When the rolling operation of each portion has been practically completed, i. e. to the point where the materials have been thoroughly incorporated and nearly all excess alcohol evaporated, portions of each of the four portions are combined on the rolls to give four new portions and in the making of these four new portions an excess of one color is used for one portion, and an excess of a different color for a second portion, and so on, giving four mottled portions each with a different color predominating. The slabs (about ½ inch thick or more) of these mottled portions as drawn from the rolls are now stacked upon one another in a press, and formed into a cake in the usual manner, the press, of the usual type, being jacketed for heating or cooling with hot or cold water and having a ram for applying pressure, and the temperature and presssure being changed at will so as to cause the slabs to coalesce and form a solid cake. In making the cakes, the slabs of one predominating color are made into one cake, the slabs of another color into another cake, and so on giving four mottled cakes each of a respective predominating color. The cakes when finally cooled are cut by a knife into sheets in the usual manner, giving four lots.

Second; the mottled colored sheets 1, desirably about .010 inch thick, are stacked up with sheets 2 of foil, for example tin foil, a single sheet of foil being placed between each two sheets of plastic, to give a stack of alternate sheets of foil and plastic. The foil is preferably about 0.003 inch thick, and the sheets about 54 x 22 inches or any other convenient dimensions. To give a desirable color effect a sheet of each color may be used in turn in making the stack, as a violet sheet, foil, green sheet, foil, blue sheet, foil, pink sheet, foil, and repeat until all sheets have been used. This is conventionally represented in Figure 2 where $1^v$, $1^g$, $1^b$, and $1^p$, indicate violet, green, blue and pink sheets.

Figure 2:
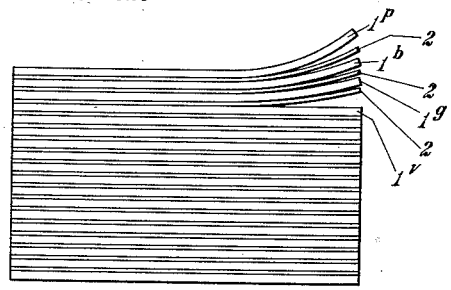
Figure 2 is an elevational view of the stack of plastic and foil sheets.
Figure 3:
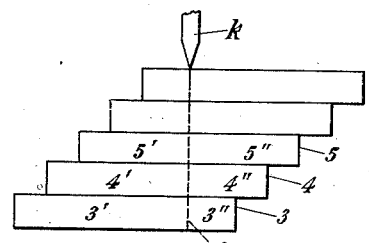
Figure 3 is an elementary showing of the manner of cutting portions of the stack, Figure 2, to provide units for making the plastic-and-foil block.

Third; from the stack, Figure 2, a section 3, Figure 3, is taken, consisting of, for example, about 36 plastic and 36 foil sheets. (No attempt is made in this figure to indicate individual sheets.) Likewise other similar sections 4, 5, etc., in suitable number are taken from the stack, and are arranged in echelon. The thus stacked sheets are now cut through with any suitable cutting knife K as indicated by the dotted line C, giving a series of sub-sections, as 3', 3", 4', 4", 5', 5" and so on, of different lengths. In this way there are provided a plurality of sub-sections of lengths adapting them to be arranged in a molding press as below described.

Figure 4:
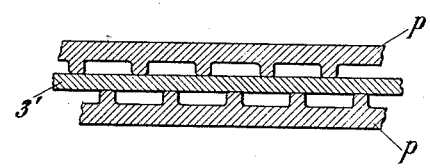
Figure 4 is an elementary view indicating the manner of making the cut portions, Figure 3, zig-zag.

Fourth; the subsections are desirably given a zig-zag form which, when the subsections are placed in the molding press, causes one subsection repeatedly to overlap the next as the corrugations of the subsections are nested. This zig-zagging or crimping may be conveniently done by placing the sub-section, as 3', between two corrugated plates, as somewhat conventionally indicated at P, P, Figure 4, and applying pressure (the sheet being warmed, if necessary) to force the plates toward each other, thus bending or crimping the sheets of the subsection into the desired form.

Figure 5:
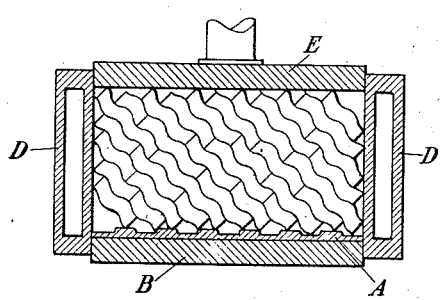
Figure 5 is an elementary view showing the zig-zagged cut portions, Figure 4, in the press, section lining of the portions being omitted to avoid confusion.

Fifth; the crimped sub-sections, 3', 3" and so on, are placed on a corrugated plate, as A, Figure 5, in a press, indicated in elementary manner at B, jacketed at D for hot or cold water to give temperature changes as desired the subsections being inclined or diagonally arranged in overlapping relation from end to end of the press, substantially as shown. By means of the ram E pressure is applied, while heat is applied by means of hot water in the jacket D, causing the materials to weld, as will be understood, giving a solid block which is firmly attached to the plate A by means of the corrugations. In the welding operation, I find it advisable to use a pressure of about 325 to 375 pounds per square inch during a period of 5 to 7 hours, the maximum temperature of the cake being about 165°–180° F.

Figure 6:
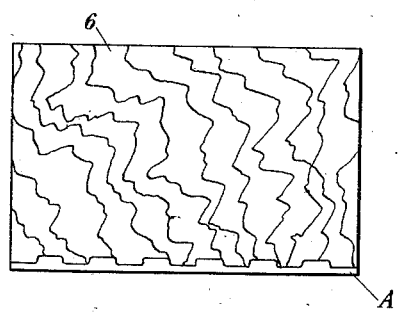
Figure 6 is a side elevation of the block made in the press, Figure 5, and from which the plastic-and-foil sheets are sheeted.
Figure 7:
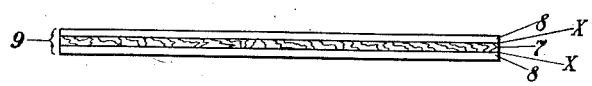
Figure 7 is a conventional edge view of a sheet from the block, Figure 6, having cover sheets, applied thereto.
Figure 8:
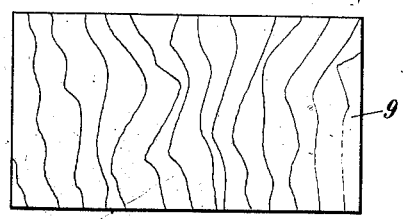
Figure 8 is a face view of the finished sheet.

Sixth; after cooling, the block 6 (Figure 6) of foil and plastic carried by the plate A is fastened in a horizontal position and sheets 7, Figure 7, of any desired thickness are cut, with any suitable knife, horizontally from the top of the block 6. The sheets thus produced show the variegated color and irregular lines characteristic of the desired artificial pearl. The sheets are now suitably dried to remove most of the volatile solvent, as denatured alcohol (as freshly made they may contain perhaps 8 to 15% volatile solvent) and, if called for, are straightened and polished in the usual way by subjecting to heat and pressure between highly polished metal polishing plates.

Seventh; to increase the strength and rigidity of the sheets, as 7, produced as above described they may, before polishing, be permanently covered, on one or both sides, with a transparent sheet 8 of plastic. Conveniently this is done by applying to the face to be covered a suitable solvent cement X (Figure 7), for example amyl acetate or acetone, and applying the covering sheets 8, 8, after which the assembled sheets are pressed firmly together in a press between metal plates until they are thoroughly cemented or welded together. The cemented sheets, giving the combined sheet 9, are dried for a few days to allow some of the solvent of the cement to evaporate, after which the sheet 9 is polished as described above and is then ready for use for articles such as buttons, buckles, toilet articles, and the like.

It will be understood that various of the steps mentioned above can be simplified or omitted, to secure a product of simpler, and yet attractive design, and therefore I intend my invention to include such simplified methods, where such methods retain the major characteristic of that above outlined. And it will also be understood that the method is applicable to plastics of cellulose esters, other than cellulose nitrate, for example cellulose acetate.

I claim:

1. That method of making a combined cellulose ester plastic product, which consists in treating surfaces of cellulose ester plastic sheets with a pigment, laying up said sheets in a press and subjecting the same to pressure under temperature changes, sheeting the block formed in the press, interposing foil between the sheets, subjecting the superposed sheets of foil and cellulose ester plastic to heat and pressure to form a homogeneous composition block, and sheeting the block to expose the edge grain thereof, substantially as described.

2. That method of making a compound cellulose ester plastic product, which consists in alternately superposing sheets of cellulose ester plastic and foil into stack form, subjecting the stack to heat and pressure for homogenizing the sheets into integral block form, and sheeting the block to expose the edge grain thereof.

3. That method of making a compound cellulose ester plastic product, which consists in superposing alternate layers of cellulose ester plastic and foil, securing said layers together into a homogeneous mass, and sheeting the mass to expose the edge grain thereof, substantially as described.

4. The method of making a compound cellulose ester plastic product, which comprises the alternate superposing of cellulose ester plastic and foil sheets, causing said sheets to coalesce into a unitary block, sheeting the block to expose the grain thereof, and securing a surface layer of transparent material over the sheets cut from the block.

5. That method of making a compound cellulose ester plastic product which consists in alternately superposing sheets of cellulose ester plastic and foil into a homogeneous block, sheeting the block to expose the grain thereof in the formed sheets, treating the surfaces of the sheets with a solvent, and applying a surface layer of transparent material to the treated surfaces of the sheets, substantially as described.

6. That method of making a compound cellulose ester plastic product, which consists in forming a block of superposed cellulose ester plastic and foil sheets, cutting the block to form sheets with the edge grain exposed, treating the sheets with an adhesive solvent, and compressing a surface layer of cellulose ester plastic against the treated surfaces of the sheets, substantially as described.

7. That method of making a compound cellulose ester plastic product, which consists in molding a plurality of sheets of cellulose ester plastic treated with a pigment into block form, sheeting said block into sheets of approximately ten one-thousandth of an inch in thickness, interposing sheets of foil of approximately three one-thousandth of an inch in thickness between the cellulose ester plastic sheets, molding the superposed cellulose ester plastic and foil sheets into block form, sheeting the second block across the grain thereof to expose the edge portions of the foil to the surface of the sheet for simulating strata, and affixing the last named sheets to a transparent surface layer.

8. That method of making a compound cellulose ester plastic product, which comprises the grinding of colors into soft cellulose ester plastic sheets from the roll, evaporating the solvent from the sheets, compressing the sheets under temperature changes to form a block of cellulose ester plastic with a pigment therein, sheeting the block, interposing foils between the sheets of the block, subjecting the interposed sheets to pressure under temperature changes to form a homogeneous composite foil and plastic block, sheeting the composite block across the grain thereof to expose the edges of the foil to the surfaces of the sheets, and securing the sheets formed to a transparent surface covering.

9. That method of making a compound cellulose ester plastic product, which consists in superposing sheets of cellulose ester plastic and foil, subjecting said superposed sheets to pressure in the presence of temperature changes to form a block and with the sheets inclined in over-lapping relation to form a diagonal grain in the block, sheeting the block to form stratified sheets, and securing the stratified sheets to a transparent surface layer.

10. That method of making a compound cellulose ester plastic product, which consists in superposing sheets of cellulose ester plastic and foil in inclined overlapping relation, subjecting such superposed sheets to pressure and temperature changes, sheeting the compressed block to form stratified sheets, treating the surfaces of the stratified sheets with an adhesive solvent, pressing a transparent surface sheet to the solvent for securing the surface sheet to the stratified sheet, seasoning the superposed sheets, and subjecting the seasoned superposed sheets to pressure between smooth plates for polishing the final product.

11. That method of making a compound cellulose ester plastic product, which comprises compressing superposed cellulose ester plastic and foil sheets into block form under temperature changes and with the sheets in inclined overlapping relation to impart a diagonal grain in the formed block, sheeting the block to form stratified sheets, seasoning the stratified sheets, applying a surface coating of adhesive solvent to the stratified sheets, applying a transparent surface sheet to the adhesive coating, compressing the superposed sheets under heat to cause the same to adhere, pressing the composite structure between highly polished plates to impart a smooth surface finish to opposite sides of the product.

12. That method of making a combined celluloid product, which consists in treating surfaces of celluloid sheets with a pigment, laying up said sheets in a press and subjecting the same to pressure under temperature changes, sheeting the block formed in the press, interposing foil between the sheets, subjecting the superposed sheets of foil and celluloid to heat and pressure to form a homogeneous composition block, and sheeting the block to expose the edge grain thereof, substantially as described.

13. That method of making a compound celluloid product, which consists in alternately superposing sheets of celluloid and foil into stack form, subjecting the stack to heat and pressure for homogenizing the sheets into integral block form, and sheeting the block to expose the edge grain thereof.

14. That method of making a compound celluloid product, which consists in superposing alternate layers of celluloid and foil, securing said layers together into a homogeneous mass, and sheeting the mass to expose the edge grain thereof, substantially as described.

15. The method of making a compound celluloid product, which comprises the alternate superposing of celluloid and foil sheets, causing said sheets to coalesce into a unitary block sheeting the block to expose the grain thereof, and securing a surface layer of transparent material over the sheets cut from the block.

16. That method of making a compound celluloid product, which consists in alternately superposing sheets of celluloid and foil into a homogeneous block, sheeting the block to expose the grain thereof in the formed sheets, treating the surfaces of the sheets with a solvent, and applying a surface layer of transparent material to the treated surfaces of the sheets, substantially as described.

17. That method of making a compound celluloid product, which consists in forming a block of superposed celluloid and foil sheets, cutting the block to form sheets with the edge grain exposed, treating the sheets with an adhesive solvent, and compressing a surface layer of celluloid against the treated surfaces of the sheets, substantially as described.

18. That method of making a compound celluloid product, which consists in molding a plurality of sheets of celluloid treated with a pigment into block form, sheeting said block into sheets of approximately ten one-thousandth of an inch in thickness, interposing sheets of foil of approximately three one-thousandth of an inch in thickness between the celluloid sheets, molding the superposed celluloid and foil sheets into block form, sheeting the second block across the grain thereof to expose the edge portions of the foil to the surface of the sheet for simulating strata, and affixing the last named sheets to a transparent surface layer.

19. That method of making a compound celluloid product which comprises the grinding of colors into soft celluloid sheets from the roll, evaporating the solvent from the sheets, compressing the sheets under temperature changes to form a block of celluloid with a pigment therein, sheeting the block, interposing foils between the sheets of the block, subjecting the interposed sheets to pressure under temperature changes to form a homogeneous composite foil and celluloid block, sheeting the composite block across the grain thereof to expose the edges of the foil to surfaces of the sheets, and securing the sheets formed to a transparent surface covering.

20. That method of making a compound celluloid product, which consists in superposing sheets of celluloid and foil, subjecting said superposed sheets to pressure in the presence of temperature changes to form a block, and with the sheets inclined in overlapping relation to form a diagonal grain in the block, sheeting the block to form stratified sheets, and securing the stratified sheets to a transparent surface layer.

21. That method of making a compound celluloid product, which consists in superposing sheets of celluloid and foil in inclined overlapping relation, subjecting such superposed sheets to pressure and temperature changes, sheeting the compressed block to form stratified sheets, treating the surfaces of the stratified sheets with an adhesive solvent, pressing a transparent surface sheet to the solvent for securing the surface sheet to the stratified sheet, seasoning the superposed sheets, and subjecting the seasoned superposed sheets to pressure between smooth plates for polishing the final product.

22. That method of making a compound celluloid product, which comprises compressing superposed celluloid and foil sheets into block form under temperature changes and with the sheets in inclined overlapping relation to impart a diagonal grain in the formed block, sheeting the block to form stratified sheets, seasoning the stratified sheets, applying a surface coating of adhesive solvent to the stratified sheets, applying a transparent surface sheet to the adhesive coating, compressing the superposed sheets under heat to cause the same to adhere, pressing the composite structure between highly polished plates to impart a smooth surface finish to opposite sides of the product.

In testimony whereof I affix my signature.

KARL W. MONROE.